United States Patent
Masuda et al.

(10) Patent No.: US 10,438,746 B2
(45) Date of Patent: *Oct. 8, 2019

(54) INSULATING FILM

(75) Inventors: Shigeyoshi Masuda, Gifu (JP); Dai Nakagawa, Gifu (JP); Kinji Hasegawa, Gifu (JP); Masanori Nishiyama, Gifu (JP)

(73) Assignee: TEIJIN LIMITED, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 13/512,515

(22) PCT Filed: Nov. 26, 2010

(86) PCT No.: PCT/JP2010/071626
§ 371 (c)(1),
(2), (4) Date: May 29, 2012

(87) PCT Pub. No.: WO2011/065585
PCT Pub. Date: Jun. 3, 2011

(65) Prior Publication Data
US 2012/0232209 A1    Sep. 13, 2012

(30) Foreign Application Priority Data
Nov. 30, 2009 (JP) ................. 2009-271838

(51) Int. Cl.
| | | |
|---|---|---|
| *C08L 71/12* | (2006.01) | |
| *H01G 4/18* | (2006.01) | |
| *C08J 5/18* | (2006.01) | |
| *C08L 25/06* | (2006.01) | |
| *C08K 5/00* | (2006.01) | |
| *C08L 83/04* | (2006.01) | |
| *C08K 3/013* | (2018.01) | |

(52) U.S. Cl.
CPC .......... *H01G 4/18* (2013.01); *C08J 5/18* (2013.01); *C08L 25/06* (2013.01); *C08L 71/12* (2013.01); *C08J 2325/04* (2013.01); *C08K 3/013* (2018.01); *C08K 5/005* (2013.01); *C08L 83/04* (2013.01); *C08L 2205/03* (2013.01)

(58) Field of Classification Search
None
See application file for complete search history.

(56) References Cited

U.S. PATENT DOCUMENTS

| | | |
|---|---|---|
| 3,530,344 A | 9/1970 | Katchman |
| 4,946,897 A | 8/1990 | Albizzati et al. |
| 5,109,068 A | 4/1992 | Yamasaki et al. |
| 5,907,129 A | 5/1999 | Funaki et al. |
| 2010/0178483 A1 | 7/2010 | Masuda et al. |

FOREIGN PATENT DOCUMENTS

| | | | |
|---|---|---|---|
| JP | 01182346 A | * | 7/1989 |
| JP | 01316246 A | * | 12/1989 |
| JP | 03124750 A | * | 5/1991 |
| JP | 06080793 A | * | 3/1994 |
| JP | 07138433 A | * | 5/1995 |
| JP | 07156263 A | * | 6/1995 |
| JP | 08283496 A | * | 10/1996 |
| JP | 2009235321 A | * | 10/2009 |
| WO | 2008/156210 A1 | | 12/2008 |

OTHER PUBLICATIONS

Machine translation of JP 07138433 A, retrieved Jul. 1, 2014.*
Derwent Abstract of JP 07138433 A, retrieved Jul. 1, 2014.*
International Search Report of PCT/JP2010/071626, dated Feb. 22, 2011.
Japanese Office Action dated May 20, 2014, issued in corresponding Japanese Patent Application No. 2009-271838, w/English translation (3 pages).
Engineering Plastics—The commentary and properties table—, The Chemical Daily Co., Ltd., 1983, pp. 153-157, with partial translation.
S.-H. Hwang, et al., "Thermal and physical properties of poly(phenylene oxide) blends with glass fiber reinforced syndiotactic polystyrene", Polymer, vol. 40, No. 21, 1999, pp. 5957-5960.
European Search Report dated May 30, 2016, issued in counterpart European Patent Application No. 10833427.7 (5 pages).
Office Action dated Jun. 14, 2016, issued in counterpart European Patent Application No. 10833427.7 (7 pages).
Office Action dated Feb. 10, 2017, issued in counterpart Korean Patent Application No. 10-2012-7016834, with English translation. (12 pages).

* cited by examiner

*Primary Examiner* — Callie E Shosho
*Assistant Examiner* — Krupa Shukla
(74) *Attorney, Agent, or Firm* — Westerman, Hattori, Daniels & Adrian, LLP

(57) ABSTRACT

Provided is a highly insulating film having excellent electrical characteristics (breakdown voltage), heat resistance, and handling properties such as windability and processability. The highly insulating film is a biaxially stretched film made of a styrene polymer having a syndiotactic structure as a main component. The highly insulating film contains specific inert fine particles A, antioxidant, and polymer Y having a glass transition temperature Tg by DSC of 130° C. or more each in a specific amount, and has a refractive index in the thickness direction of 1.5750 or more and 1.6350 or less.

14 Claims, No Drawings

INSULATING FILM

TECHNICAL FIELD

The present invention relates to a highly insulating film. More specifically, the invention relates to a highly insulating film having excellent electrical characteristics and heat resistance, in particular, high breakdown voltage.

BACKGROUND ART

Films made of a syndiotactic polystyrene resin composition (syndiotactic polystyrene films) have excellent heat resistance, chemical resistance, hot water resistance, dielectric characteristics, electrical insulation, etc., and thus are expected to be used in various applications. In particular, for their excellent dielectric characteristics together with high electrical insulation and heat resistance, they are expected to be used as insulators for capacitors (Patent Documents 1 and 2). Then, further improvements have been made, and techniques related to syndiotactic polystyrene films for use in capacitor applications have been disclosed. For example, Patent Document 3 discloses a technique for improving withstand voltage by suppressing impurities in a film, Patent Document 4 discloses a technique for improving handling properties and wear resistance by adjusting particles added, etc., and Patent Documents 5 and 6 disclose a technique for reducing thickness variations by adjusting the refractive index of a film. In addition, Patent Document 7 discloses a technique for improving breakdown voltage by adding an antioxidant.

(Patent Document 1) JP-A-1-182346
(Patent Document 2) JP-A-1-316246
(Patent Document 3) JP-A-3-124750
(Patent Document 4) JP-A-6-80793
(Patent Document 5) JP-A-7-156263
(Patent Document 6) JP-A-8-283496
(Patent Document 7) JP-A-2009-235321

DISCLOSURE OF THE INVENTION

The syndiotactic polystyrene films disclosed in Patent Documents 1 to 6 are for use as insulators for capacitors; however, for example, for higher-performance capacitors such as capacitors for use in recent hybrid cars, films having even better breakdown voltage and like electrical characteristics and heat resistance have been demanded, and their performance may be insufficient. In addition, although the syndiotactic polystyrene film disclosed in Patent Document 7 is suitable for capacitors for hybrid cars, etc., further improvements in heat resistance and breakdown voltage have been demanded.

Further, for the purpose of improving the capacitance of a capacitor or reducing the size of a capacitor, films that serve as insulators are demanded to be further thinned. However, thinning generally leads to the deterioration of handling properties. Accordingly, there has been a demand for a film having improved handling properties even when thinned, which does not cause a decrease in productivity in the film production process and can be adapted to the capacitor production rate recently required.

The present invention was accomplished to solve the problems mentioned above. An object of the invention is to provide a highly insulating film having excellent electrical characteristics, heat resistance, and handling properties such as windability and processability.

The present inventors conducted extensive research to solve the problems mentioned above and, as a result, found the following: in a syndiotactic polystyrene biaxially stretched film, when a polymer having a specific glass transition temperature is incorporated in addition to an antioxidant and specific inert fine particles, and the film has a specific orientation structure, a highly insulating film having high breakdown voltage together with excellent heat resistance and handling properties is obtained. They thus accomplished the invention.

That is, the invention is:
1. A highly insulating film comprising a biaxially stretched film made of a styrene polymer having a syndiotactic structure as a main component, the biaxially stretched film containing: inert fine particles A having an average particle size of 0.05 μm or more and 1.5 μm or less with a relative standard deviation in particle size of 0.5 or less in an amount of 0.05 mass % or more and 2.0 mass % or less; an antioxidant in an amount of 0.1 mass % or more and 8 mass % or less; and a polymer Y having a glass transition temperature Tg by DSC of 130° C. or more in an amount of 5 mass % or more and 48 mass % or less, the biaxially stretched film has a refractive index in the thickness direction of 1.5750 or more and 1.6350 or less.

The invention further includes the following aspects.
2. A highly insulating film according to 1 above, wherein the polymer Y is polyphenylene ether represented by the following formula (I):

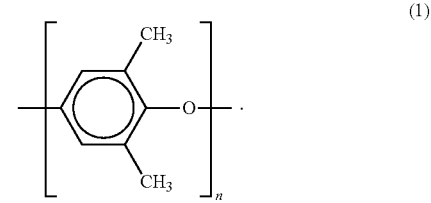

3. A highly insulating film according to 1 or 2 above, wherein the content ratio of the polymer Y to the antioxidant (polymer Y content/antioxidant content) is 1 to 100.
4. A highly insulating film according to any one of 1 to 3 above, having: a loss modulus (E") peak temperature of 120° C. or more and 150° C. or less as measured by dynamic viscoelasticity measurement at an oscillation frequency of Hz; and a dielectric loss tangent (tan δ) at 120° C. of 0.0015 or less at a frequency of 1 kHz.
5. A highly insulating film according to any one of 1 to 4 above, having a heat shrinkage rate at 200° C.×10 minutes of 6% or less in longitudinal and transverse directions thereof.
6. A highly insulating film according to any one of 1 to 5 above, having a breakdown voltage (BDV) at 120° C. of 350 V/μm or more.
7. A highly insulating film according to any one of 1 to 6 above, having a storage modulus (E') at 120° C. of 600 MPa or more as measured by dynamic viscoelasticity measurement at an oscillation frequency of 10 Hz.
8. A highly insulating film according to any one of 1 to 7 above, having a film thickness of 0.4 μm or more and less than 6.5 μm.
9. A highly insulating film according to any one of 1 to 8 above, containing inert fine particles B having an average particle size of 0.5 μm or more and 3.0 μm or less with a relative standard deviation in particle size of 0.5 or less in an amount of 0.01 mass % or more and 1.5 mass % or less, with the average particle size of the inert fine particles B being at least 0.2 µm larger than the average particle size of the inert fine particles A.

10. A highly insulating film according to any one of 1 to 9 above, wherein the inert fine particles A are spherical particles having a particle size ratio of 1.0 or more and 1.3 or less.

11. A highly insulating film according to 10 above, wherein the inert fine particles A are spherical polymer resin particles.

12. A highly insulating film according to 10 above, wherein the inert fine particles A are spherical silicone resin particles.

13. A highly insulating film according to any one of 9 to 12 above, wherein the inert fine particles B are spherical polymer resin particles having a particle size ratio of 1.0 or more and 1.3 or less.

14. A highly insulating film according to any one of 1 to 13 above, wherein the antioxidant has a thermal decomposition temperature of 250° C. or more.

The invention also includes:

15. A capacitor made using a highly insulating film according to any one of 1 to 14 above.

BEST MODE FOR CARRYING OUT THE INVENTION

The highly insulating film of the invention is a biaxially stretched film made of the below-mentioned styrene polymer as a main component. The term "main" herein means that based on the mass of the biaxially stretched film, the amount is more than 50 mass %, preferably 55 mass % or more, still more preferably 60 mass % or more, and particularly preferably 65 mass % or more. In addition, the highly insulating film of the invention contains the below-mentioned inert fine particles A, antioxidant, and polymer Y having a glass transition temperature Tg by DSC of 130° C. or more. Hereinafter, the components forming the highly insulating film of the invention will be described.

<Styrene Polymer>

The styrene polymer in the invention is a styrene polymer having a syndiotactic structure. That is, it has a stereochemical structure in which relative to the main chain formed of a carbon-carbon bond, phenyl groups and substituted phenyl groups serving as side chains are alternately positioned in opposite directions. Generally, tacticity is quantitatively determined by carbon isotope nuclear magnetic resonance ($^{13}$C-NMR method), and is defined by the proportion of a plurality of successive structural units. For example, it is a dyad in the case of two units, a triad in the case of three units, and a pentad in the case of five units. In the invention, styrene polymers having a syndiotactic structure include polystyrene, poly(alkylstyrenes), poly(halostyrenes), poly(alkoxystyrenes), and poly(vinyl benzoate) with syndiotacticity having 75% or more (preferably 85% or more) racemic dyads (r) or 30% or more (preferably 50% or more) racemic pentads (rrrr); polymers obtained by partially hydrogenating these benzene rings; mixtures thereof; and copolymers containing these structural units. Examples of poly(alkylstyrenes) herein include poly(methylstyrene), poly(ethylstyrene), poly(propylstyrene), poly(butylstyrene), poly(phenylstyrene), poly(vinylnaphthalene), poly(vinylstyrene), and poly(acenaphthylene). Examples of poly(halostyrenes) include poly(chlorostyrene), poly(bromostyrene), and poly(fluorostyrene). Examples of poly(alkoxystyrenes) include poly(methoxystyrene) and poly(ethoxystyrene). Among them, particularly preferred examples of styrene polymers include polystyrene, poly(p-methylstyrene), poly(m-methylstyrene), poly(p-t-butylstyrene), poly(p-chlorostyrene), poly(m-chlorostyrene), poly(p-fluorostyrene), and copolymers of styrene and p-methylstyrene.

Further, in the case where the styrene polymer contains a copolymer component and used as a copolymer, examples of such comonomers include monomers of the styrene polymers mentioned above, as well as olefin monomers such as ethylene, propylene, butene, hexene, and octene, diene monomers such as butadiene and isoprene, cyclodiene monomers, and polar vinyl monomers such as methyl methacrylate, maleic anhydride, and acrylonitrile.

The weight average molecular weight of the styrene polymer is preferably $1.0 \times 10^4$ or more and $3.0 \times 10^6$ or less, still more preferably $5.0 \times 10^4$ or more and $1.5 \times 10^6$ or less, and particularly preferably $1.1 \times 10^5$ or more and $8.0 \times 10^5$ or less. A weight average molecular weight of $1.0 \times 10^4$ or more makes it possible to obtain a film having excellent strength characteristics and elongation characteristics together with further improved heat resistance. In addition, a weight average molecular weight of $3.0 \times 10^6$ or less results in a stretching tension within a suitable range, whereby breakage and the like are less likely to occur during the formation of a film, etc.

A method for producing such a styrene polymer having a syndiotactic structure is disclosed in JP-A-62-187708, for example. That is, it can be produced by polymerizing a styrene monomer (monomer corresponding to the styrene polymer mentioned above) in an inert hydrocarbon solvent or in the absence of a solvent using a titanium compound and a condensation product of water and an organoaluminum compound, particularly a trialkylaluminum, as catalysts. In addition, poly(haloalkylstyrenes) are disclosed in JP-A-1-146912, while hydrogenated polymers are disclosed in JP-A-1-178505.

As necessary, appropriate amounts of known additives such as antistatic agents may be incorporated into the styrene polymer having a syndiotactic structure in the invention. It is preferable that the amount of such additives incorporated is 10 parts by mass or less per 100 parts by mass of the styrene polymer. When the amount is more than 10 parts by mass, breakage is likely to occur during stretching, resulting in poor production stability; therefore, this is undesirable.

Such a styrene polymer having a syndiotactic structure has much better heat resistance as compared with conventional styrene polymers having an atactic structure.

<Antioxidant>

The antioxidant in the invention may be a primary antioxidant that captures produced radicals to prevent oxidation or a secondary antioxidant that decomposes a produced peroxide to prevent oxidation. Examples of primary antioxidants include phenolic antioxidants and aminic antioxidants, and examples of secondary antioxidants include phosphoric antioxidants and sulfuric antioxidants.

Specific examples of phenolic antioxidants include monophenolic antioxidants such as 2,6-di-t-butyl-4-methylphenol, 2,6-di-t-butyl-4-ethylphenol, 2-t-butyl-4-methoxyphenol, 3-t-butyl-4-methoxyphenol, 2,6-di-t-butyl-4-{4,6-bis(octylthio)-1,3,5-triazin-2-ylamino}phenol, and n-octadecyl-3-(3,5-di-t-butyl-4-hydroxyphenyl)propionate. Examples also include bisphenolic antioxidants such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), N,N'-bis{3-(3,5-di-t-butyl-4-hydroxyphenyl) propionyl}hydrazine, N,N'-hexane-1,6-diylbis[3-(3,5-di-t- butyl-4-hydroxyphenyl)propionamide], and 3,9-bis{1,1-dimethyl-2-{β-(3-t-butyl-4-hydroxy-5-methylphenyl)propionyloxy}ethyl}-2,4,8,10-tetraoxaspiro{5.5}undecane. Examples also include polymeric phenolic antioxidants such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, pentaerythritol tetrakis{3-(3,5-di-t-butyl-4-hydroxyphenyl)propionate}, bis{3,3'-bis-(4'-hydroxy-3'-t-butylphenyl)butyric acid}glycol ester, 1,3,5-tris(3',5'-di-t-butyl-4'-hydroxybenzyl)-sec-triazine-2,4,6-(1H,3H,5H) trione, and d-α-tocophenol.

Specific examples of aminic antioxidants include alkylated diphenylamines.

Specific examples of phosphoric antioxidants include triphenyl phosphite, diphenyl isodecyl phosphite, phenyl diisodecyl phosphite, 4,4'-butylidene-bis(3-methyl-6-t-butylphenylditridecyl)phosphite, octadecyl phosphite, tris(nonylphenyl)phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl) phosphite, cyclic neopentanetetraylbis(2,4-di-t-butylphenyl) phosphite, cyclic neopentanetetraylbis(2,6-di-t-butyl-4-methylphenyl) phosphite, and 2,2'-methylenebis(4,6-di-t-butylphenyl) octylphosphite.

Specific examples of sulfuric antioxidants include dilauryl-3,3'-thiodipropionate, dimyristyl-3,3'-thiodipropionate, distearyl-3,3'-thiodipropionate, pentaerythritol tetrakis(3-laurylthiopropionate), and 2-mercaptobenzimidazole.

It is preferable that the antioxidant is a primary antioxidant. This is because primary antioxidants have particularly better corrosion resistance and can further enhance the breakdown-voltage-improving effect. Among them, phenolic antioxidants are particularly preferable.

It is preferable that the antioxidant has a thermal decomposition temperature of 250° C. or more. As shown in the Examples of the invention, a higher thermal decomposition temperature leads to a higher breakdown-voltage-improving effect at high temperatures. In the case where the thermal decomposition temperature is too low, the antioxidant itself undergoes thermal decomposition during melt extrusion, which is likely to cause problems in that the process is contaminated, the polymer is colored yellow, etc.; therefore, this is undesirable. From such a point of view, the thermal decomposition temperature of the antioxidant is more preferably 280° C. or more, still more preferably 300° C. or more, and particularly preferably 320° C. or more. In the invention, an antioxidant that is less susceptible to thermal decomposition and has a higher thermal decomposition temperature is more desirable. However, practically, the upper limit is about 500° C. or less.

It is also preferable that the antioxidant has a melting point of 90° C. or more. In the case where the melting point is too low, the antioxidant tends to dissolve more quickly than a polymer during melt extrusion, whereby the polymer slips at a screw feed portion of the extruder. As a result, the polymer supply is destabilized, causing problems such as a greater variation in film thickness. From such a point of view, the melting point of the antioxidant is more preferably 120° C. or more, still more preferably 150° C. or more, and particularly preferably 200° C. or more. Meanwhile, in the case where the melting point of the antioxidant is too high, the antioxidant is unlikely to dissolve during melt extrusion, resulting in poor dispersion in a polymer. This causes problems in that the effect of the addition of the antioxidant is exhibited only locally, for example. From such a point of view, the melting point of the antioxidant is preferably 300° C. or less, more preferably 250° C. or less, still more preferably 220° C. or less, and particularly preferably 170° C. or less.

As the antioxidant mentioned above, a commercially available product may also be used directly. Preferred examples of commercially available products include pentaerythritol tetrakis{3-(3,5-di-t-butyl-4-hydroxyphenyl)propionate} (manufactured by Ciba Specialty Chemicals, trade name: IRGANOX 1010), N,N'-bis{3-(3,5-di-t-butyl-4-hydroxyphenyl)propiony}hydrazine (manufactured by Ciba Specialty Chemicals, trade name: IRGANOX 1024), and N,N'-hexane-1,6-diylbis{3-(3,5-di-t-butyl-4-hydroxyphenyl)propionamide} (manufactured by Ciba Specialty Chemicals, trade name: IRGANOX 1098).

The highly insulating film of the invention contains the antioxidant in an amount of 0.1 mass % or more and 8 mass % or less based on the mass of the highly insulating film. An antioxidant content within the above numerical range leads to excellent breakdown voltage. In the case where the antioxidant content is too low, the effect of the addition of the antioxidant is insufficient, whereby breakdown voltage tends to decrease, resulting in poor electrical characteristics. From such a point of view, the antioxidant content is preferably 0.2 mass % or more, still more preferably 0.5 mass % or more, and particularly preferably 1 mass % or more. Meanwhile, in the case where the content is too high, the antioxidant is likely to aggregate in a film. As a result, defects caused by the antioxidant tend to increase, and such defects cause a decrease in breakdown voltage. From such a point of view, the antioxidant content is preferably 7 mass % or less, still more preferably 5 mass % or less, and particularly preferably 3 mass % or less.

One kind of antioxidant may be used alone, and it is also possible to use two or more kinds together. In the case where two or more kinds are used together, it is possible to use two or more kinds of primary antioxidants, and it is also possible to use two or more kinds of secondary antioxidants. It is also possible to use one or more kinds of primary antioxidants together with one or more kinds of secondary antioxidants. For example, a combined use of two kinds of antioxidants, a primary antioxidant and a secondary antioxidant, is expected to prevent both primary oxidation and secondary oxidation. In the invention, in particular, it is preferable to use a primary antioxidant alone or use two or more kinds of primary antioxidants because the breakdown-voltage-improving effect can be thereby further enhanced. It is particularly preferable to use a phenolic antioxidant alone or use two or more kinds of phenolic antioxidants.

<Polymer Y>

The polymer Y in the invention has a glass transition temperature Tg of 130° C. or more as determined by DSC (differential scanning calorimeter). It is preferable that the polymer Y has a Tg higher than the glass transition temperature of the styrene polymer mentioned above. When such a polymer Y is incorporated into the styrene polymer, this not only increases the glass transition temperature Tg as a mixture, but also improves heat resistance, leading to a higher breakdown voltage at high temperatures as shown in the Examples of the invention. In addition, the highly insulating film is provided with excellent thermal dimensional stability. From such a point of view, the glass transition temperature Tg of the polymer Y is preferably 150° C. or more, still more preferably 180° C. or more, and particularly preferably 200° C. or more. The higher the glass transition temperature Tg of the polymer Y to be incorporated, the more the above improving effects on thermal dimensional stability and the like are enhanced. In consideration of melt extrusion and the like, the practical upper limit is preferably 350° C., and more preferably 300° C.

Preferred examples of such polymers Y include aromatic polyethers such as polyphenylene ether represented by the following formula (I) and polyetherimide, polycarbonate, polyarylate, polysulfone, polyethersulfone, and polyimide. Amorphous polymers are particularly preferable. Among them, polyphenylene ether is particularly preferable because it improves not only heat resistance and dimensional stability but also breakdown voltage probably in synergy with the antioxidant.

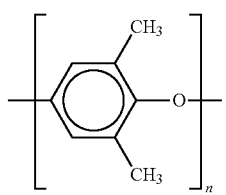

(1)

The highly insulating film of the invention is a biaxially stretched film made of a resin composition obtained by incorporating, into the styrene polymer, the polymer Y in an amount of 5 mass % or more and 48 mass % or less. When the amount of the polymer Y incorporated is within the above range, excellent heat resistance and electrical characteristics (breakdown voltage) are provided. That is, breakdown voltage at high temperatures can be increased. In the case where the content is too low, this tends to result in poor heat resistance and electrical characteristics. From such a point of view, the polymer Y content is preferably 8 mass % or more, still more preferably 11 mass % or more, and particularly preferably 20 mass % or more. When the content is too high, the crystallinity of the styrene polymer having a syndiotactic structure tends to decrease easily, and the film tends to have poor heat resistance. From such a point of view, the polymer Y content is preferably 45 mass % or less, still more preferably 40 mass % or less, and particularly preferably 35 mass % or less.

The polymer Y and the antioxidant are each contained as above in the highly insulating film of the invention. As a result, particularly excellent electrical characteristics (breakdown voltage) and heat resistance can be obtained. That is, breakdown voltage at high temperatures can be further increased.

It is also preferable that the content ratio of the polymer Y to the antioxidant (polymer Y content/antioxidant content) is 1 to 100. A content ratio within the above numerical range leads to particularly excellent electrical characteristics (breakdown voltage) and heat resistance. When the content ratio is too low or too high, this tends to decrease the effectiveness in further increasing electrical characteristics and heat resistance. From such a point of view, the content ratio is still more preferably 3 to 50, and particularly preferably 5 to 30.

<Inert Fine Particles A>

The highly insulating film of the invention contains inert fine particles A whose average particle size and relative standard deviation in particle size are within specific numerical ranges.

The inert fine particles A have an average particle size of 0.05 μm or more and 1.5 μm or less. When the average particle size of the inert fine particles A is within the above numerical range, the film can be provided with excellent air permeability while maintaining the high breakdown voltage, whereby a highly insulating film with excellent windability can be obtained. In the case where the average particle size of the inert fine particles A is too small, sufficient air permeability is unlikely to be obtained, leading to poor windability. From such a point of view, the average particle size of the inert fine particles A is preferably 0.1 μm or more, still more preferably 0.15 μm or more, and particularly preferably 0.2 μm or more. Meanwhile, when the average particle size is too large, voids in the film tend to increase in size, whereby breakdown voltage decreases. From such a point of view, the average particle size of the inert fine particles A is preferably 1.0 μm or less, still more preferably 0.6 μm or less, and particularly preferably 0.5 μm or less.

The inert fine particles A have a relative standard deviation in particle size of 0.5 or less. When the relative standard deviation in particle size is within the above numerical range, projections on the film surface are uniform in height, leading to excellent windability. In addition, coarse particles and coarse projections are reduced, leading to excellent breakdown voltage. From such a point of view, the relative standard deviation in particle size of the inert fine particles A is preferably 0.4 or less, still more preferably 0.3 or less, and particularly preferably 0.2 or less.

Further, it is preferable that the inert fine particles A in the invention are spherical particles having a particle size ratio of 1.0 or more and 1.3 or less. The particle size ratio is still more preferably 1.0 or more and 1.2 or less, and particularly preferably 1.0 or more and 1.1 or less. When the particle size ratio is within the above numerical range, the windability-improving effect and the breakdown-voltage-improving effect can be further enhanced.

The highly insulating film of the invention contains such inert fine particles A in an amount of 0.05 mass % or more and 2.0 mass % or less based on 100 mass % of the highly insulating film. When the inert fine particles A are contained in an amount within the above numerical range, the film can be provided with excellent handling properties such as windability, while maintaining the high breakdown voltage. In the case where the content of the inert fine particles A is too low, this tends to result in poor air permeability, leading to poor windability. From such a point of view, the content of the inert fine particles A is preferably 0.1 mass % or more, still more preferably 0.1 mass % or more, and particularly preferably 0.1 mass % or more. Meanwhile, in the case where the content is too high, the film surface tends to be too rough. As a result, the chipping resistance of the film surface tends to decrease, leading poor breakdown voltage. In addition, particularly in capacitor applications, the space factor tends to increase. From such a point of view, the content of the inert fine particles A is preferably 1.0 mass % or less, still more preferably 0.5 mass % or less, and particularly preferably 0.3 mass % or less.

The inert fine particles A may be organic fine particles or inorganic fine particles.

Examples of organic fine particles include polymer resin particles such as polystyrene resin particles, silicone resin particles, acrylic resin particles, styrene-acrylic resin particles, divinylbenzene-acrylic resin particles, polyester resin particles, polyimide resin particles, and melamine resin particles. In particular, silicone resin particles and polystyrene resin particles are particularly preferable because they lead to excellent slidability and chipping resistance. As mentioned above, it is preferable that such polymer resin particles are spherical. That is, spherical polymer resin particles are preferable. Among these, spherical silicone resin particles and spherical polystyrene resin particles are particularly preferable because they lead to even better slidability and chipping resistance.

Examples of inorganic fine particles include (1) silicon dioxide (including hydrates, quartz sand, quartz, etc.); (2) various crystal forms of alumina; (3) silicates having a $SiO_2$ component content of 30 mass % or more (e.g., amorphous or crystalline clay minerals, aluminosilicates (including calcined products and hydrates), chrysotile, zircon, fly ash, etc.); (4) oxides of Mg, Zn, Zr, and Ti; (5) sulfates of Ca and Ba; (6) phosphates of Li, Ba, and Ca (including monohydrogen salts and dihydrogen salts); (7) benzoates of Li, Na, and K; (8) terephthalates of Ca, Ba, Zn, and Mn; (9) titanates of Mg, Ca, Ba, Zn, Cd, Pb, Sr, Mn, Fe, Co, and Ni; (10) chromates of Ba and Pb; (11) carbon (e.g., carbon black, graphite, etc.); (12) glass (e.g., glass powder, glass beads, etc.); (13) carbonates of Ca and Mg; (14) fluorite; and (15) spinel-type oxides. Among these, calcium carbonate particles and silica particles are preferable because they lead to excellent slidability and chipping resistance. Silica particles are particularly preferable. As mentioned above, it is preferable that such inorganic fine particles are spherical. Spherical silica particles are particularly preferable because they lead to even better slidability and chipping resistance.

As the inert fine particles A, spherical silicone resin particles are most preferable. In the case of using spherical silicone resin particles as the inert fine particles A, when polyphenylene ether is used as the polymer Y, particularly high heat resistance is achieved through a synergistic effect.

<Inert Fine Particles B>

It is preferable that the highly insulating film of the invention contains, in addition to the inert fine particles A mentioned above, inert fine particles B whose average particle size and relative standard deviation in particle size are within specific numerical ranges.

The inert fine particles B have an average particle size of 0.5 µm or more and 3.0 µm or less. When the average particle size of the inert fine particles B is within the above numerical range, moderate slidability can be obtained, and the windability-improving effect can be enhanced. In the case where the average particle size of the inert fine particles B is too small, slidability tends to decrease, whereby the windability-improving effect is reduced. From such a point of view, the average particle size of the inert fine particles B is preferably 0.7 µm or more, still more preferably 1.0 µm or more, and particularly preferably 1.1 µm or more. Meanwhile, in the case the average particle size is too large, projections on the film surface tend to be too large in height, leading to slidability that is too high. As a result, the windability-improving effect is reduced; for example, edge misalignment is likely to occur during winding up. Further, chipping resistance tends to decrease, and the breakdown-voltage-improving effect is reduced. From such a point of view, the average particle size of the inert fine particles B is preferably 2.0 µm or less, still more preferably 1.5 µm or less, and particularly preferably 1.3 µm or less.

The average particle size of the inert fine particles B is at least 0.2 µm larger than the average particle size of the inert fine particles A. When the difference between the average particle size of the inert fine particles A and the average particle size of the inert fine particles B is as above, tall projections (projections with a relatively large height) formed by the inert fine particles B are scattered over the film surface, resulting in even better air permeability between films. At the same time, short projections formed by the inert fine particles A are present, resulting in even better slidability between films. Accordingly, the windability-improving effect can be enhanced; for example, when the film is wound up to form a roll, air permeability and slidability are well-balanced, whereby a film roll with a good wound configuration can be obtained even at a high wind-up rate. From such a point of view, the average particle size of the inert fine particles B is preferably at least 0.4 µm larger, still more preferably at least 0.6 µm larger, and particularly preferably at least 0.8 µm larger than the average particle size of the inert fine particles A.

In addition, from the same point of view as in the case of the inert fine particles A mentioned above, the inert fine particles B have a relative standard deviation in particle size of 0.5 or less. The relative standard deviation in particle size of the inert fine particles B is preferably 0.4 or less, still more preferably 0.3 or less, and particularly preferably 0.2 or less.

Further, from the same point of view as in the case of the inert fine particles A mentioned above, it is preferable that the inert fine particles B are spherical particles having a particle size ratio of 1.0 or more and 1.3 or less, still more preferably 1.0 or more and 1.2 or less, and particularly preferably 1.0 or more and 1.1 or less.

It is preferable that the highly insulating film of the invention contains such inert fine particles B in an amount of 0.01 mass % or more and 1.5 mass % or less based on 100 mass % of the highly insulating film. When the inert fine particles B are contained in an amount within the above numerical range, the improving effect on the handling properties of the film, such as windability, can be enhanced, while maintaining the high breakdown voltage. In the case where the content of the inert fine particles B is too low, slidability tends to decrease, whereby the windability-improving effect is reduced. From such a point of view, the content of the inert fine particles B is more preferably 0.05 mass % or more, still more preferably 0.1 mass % or more, and particularly preferably 0.2 mass % or more. Meanwhile, in the case where the content is too high, voids in the film tend to increase in frequency, whereby the breakdown-voltage-improving effect is reduced. In addition, slidability tends to be too high, and the windability-improving effect is reduced; for example, edge misalignment is likely to occur during winding up. From such a point of view, the content of the inert fine particles B is more preferably 1.0 mass % or less, still more preferably 0.5 mass % or less, and particularly preferably 0.4 mass % or less.

As the inert fine particles B, the same organic fine particles and inorganic fine particles as mentioned above for the inert fine particles A are usable. Among these, organic fine particles are preferable, and spherical silicone resin particles and spherical polystyrene resin particles are preferable because they lead to excellent slidability and chipping resistance. Spherical silicone resin particle are particularly preferable. As mentioned above, it is preferable that such organic fine particles are spherical. Spherical silicone resin particles are particularly preferable because they lead to even better slidability and chipping resistance. In the case of using spherical silicone resin particles as the inert fine particles B, when polyphenylene ether is used as the polymer Y, particularly high heat resistance is achieved through a synergistic effect.

The method for adding the inert fine particles A and inert fine particles B used in the invention is not limited as long as they are contained in the final film. For example, a method in which they are added at any stage of melt extrusion is mentioned. It is also possible to use dispersants, surfactants, and the like in order to effectively disperse these fine particles.

In the invention, in the case where both the inert fine particles A and the inert fine particles B are used, according to a preferred aspect, both may be spherical silicone resin particles, for example. Even in such a case, each kind of particles have a different average particle size, and also each kind of particles have a small relative standard deviation in particle size. Therefore, in a particle-size distribution curve, the above two kinds of particles have clearly distinguishable two particle-size peaks; that is, the inert fine particles A and the inert fine particles B can be clearly distinguished from each other. Incidentally, in the case where two particle-size peaks overlap at their bases and form a valley, the peaks can be decomposed into two particle-size peaks at the point of the minimum in the valley as the boundary.

<Other Additives>

The highly insulating film of the invention contains the styrene polymer having a syndiotactic structure, the inert fine particles A, the antioxidant, and the polymer Y. Further, in order to improve moldability, dynamic physical properties, surface properties, etc., other resin components different from the polymer Y may further be contained.

Preferred examples of other resin components that can be contained include styrene polymers having an atactic structure, styrene polymers having an isotactic structure, and styrene-maleic anhydride copolymers. This is because they are compatible with the styrene polymer having a syndiotactic structure and effective in controlling crystallization in the preparation of a preliminary formed body for stretching. Further, the subsequent stretching properties are improved, the stretching conditions can be easily controlled, and a film having excellent dynamic physical properties can be obtained. Among these, when a styrene polymer having an atactic structure and/or an isotactic structure is contained, it is preferable that such a styrene polymer is formed from the same monomers as the styrene polymer having a syndiotactic structure. In addition, the content of such a compatible resin component may be preferably 40 parts by mass or less, still more preferably 20 parts by mass or less, and particularly preferably 10 parts by mass or less per 100 parts by mass of the styrene polymer having a syndiotactic structure. When the compatible resin component content is more than 40 parts by mass, the heat-resistance-improving effect, which is an advantage of the styrene polymer having a syndiotactic structure, is reduced.

In addition, among other resin components that can be contained, resins incompatible with the styrene polymer having a syndiotactic structure are resins other than the compatible resins mentioned above. Examples thereof include polyolefins such as polyethylene, polypropylene, polybutene, and polypentene; polyesters such as polyethylene terephthalate, polybutylene terephthalate, and polyethylene naphthalate; polyamides such as Nylon 6 and Nylon 6,6; polythioethers such as polyphenylene sulfide; vinyl halide polymers such as polyacrylate, polysulfone, polyetheretherketone, polyethersulfone, polyimide, and Teflon®; acrylic polymers such as polymethyl methacrylate; and polyvinyl alcohol. Examples further include crosslinked resins containing the compatible resins mentioned above. These resins are incompatible with the styrene polymer having a syndiotactic structure of the invention. Therefore, when a small amount is contained, such a resin can be dispersed in the form of islands in the styrene polymer having a syndiotactic structure. This is effective in imparting moderate gloss after stretching or improving surface slidability. The incompatible resin component content is preferably 30 parts by mass or less, still more preferably 20 parts by mass or less, and particularly preferably 10 parts by mass or less per 100 parts by mass of the styrene polymer having a syndiotactic structure. In addition, in the case where the temperature at which the product is to be used is high, it is preferable that a relatively heat-resistant, incompatible resin component is contained.

Further, as long as the object of the invention is not impaired, additives such as antistatic agents, coloring agents, and weatherproofing agents may be added.

<Film Characteristics>

(Refractive Index in Thickness Direction)

The highly insulating film of the invention has a refractive index in the thickness direction of 1.5750 or more and 1.6350 or less. When the refractive index in the thickness direction is within the above numerical range, breakdown voltage can be increased. In addition, the frequency of film breakage during the film production process decreases, whereby productivity can be improved. In the case where the refractive index in the thickness direction is too high, the frequency of film breakage during the film production process tends to increase, and film productivity decreases. From such a point of view, the refractive index in the thickness direction is preferably 1.6200 or less, still more preferably 1.6150 or less, and particularly preferably 1.6100 or less. Meanwhile, in the case where the refractive index in the thickness direction is too low, breakdown voltage tends to decrease, resulting in poor electrical characteristics. In addition, the frequency of film breakage during the capacitor production process increases, and capacitor productivity decreases. Further, this tends to result in a greater variation in film thickness, making it difficult to obtain a capacitor having stable quality. From such a point of view, the refractive index in the thickness direction is preferably 1.5800 or more, still more preferably 1.5850 or more, and particularly preferably 1.5850 or more.

The refractive index in the thickness direction mentioned above is achieved by the below-mentioned production method. That is, the preferred refractive index in the thickness direction in the invention is achieved when the film draw ratio is within the below-mentioned specific numerical range, and also the stretching process is performed as follows: in stretching after uniaxial stretching, which is performed in the direction perpendicular to the uniaxial direction, the stretching temperature is divided into several levels, and a specific temperature difference is established between the temperature of the first stage and the temperature of the final stage.

(Film Thickness)

It is preferable that the highly insulating film of the invention has a film thickness of 0.4 μm or more and less than 6.5 μm. The film thickness is still more preferably 0.4 μm or more and less than 6.0 μm, and particularly preferably 0.5 μm or more and less than 3.5 μm. When the film thickness is within the above numerical range, a capacitor with high capacitance can be obtained.

With respect to a film for use as an insulator for capacitors, it is generally well known that a smaller film thickness leads to a capacitor with higher capacitance and thus is more desirable. However, when the film thickness is actually reduced (thinning), the following problems arise: handling properties deteriorate, for example, the film is likely to wrinkle or the film is likely to break; added particles are likely to fall down, whereby breakdown voltage decreases; a reduction in film thickness leads to a decrease in the absolute value of breakdown voltage; etc. Therefore, it is indispensable to balance them. According to the invention, in order to prevent the above problems even when the film thickness is reduced, a highly insulating film having a novel structure containing an antioxidant, specific particles, and a specific polymer is obtained by the below-mentioned production method.

(Breakdown Voltage (BDV))

It is preferable that the highly insulating film of the invention has a breakdown voltage (BDV) at 120° C. of 350 V/μm or more. A breakdown voltage within the above numerical range indicates that the film has excellent breakdown voltage even at high temperatures. It is still more preferable that the breakdown voltage is 400 V/μm or more. In order to achieve the above breakdown voltage, the aspect of film orientation and the aspects of the polymer Y and antioxidant in the film may be as specified in the invention. In addition, the breakdown voltage may also be adjusted by suitably adjusting the aspects of the inert fine particles A and inert fine particles B. In addition, it is also advantageous that the content ratio of the polymer Y to the antioxidant (polymer Y content/antioxidant content) is within the preferred range specified in the invention. When the amount of the polymer Y or antioxidant added is reduced, the breakdown voltage tends to decrease. In addition, when the content of the inert fine particles A or inert fine particles B is increased, the breakdown voltage tends to decrease.

In addition, the breakdown voltage of the highly insulating film of the invention at 23° C. is preferably 400 V/μm or more, and still more preferably 480 V/μm or more, which can be achieved by the same method as for the breakdown voltage at 120° C. mentioned above.

(Storage Modulus (E'))

It is preferable that the highly insulating film of the invention has a storage modulus (E') at 120° C. of 600 MPa or more as measured by dynamic viscoelasticity measurement at a frequency of 10 Hz. When the storage modulus (E') at 120° C. is within the above numerical range, the film has excellent mechanical properties in a high-temperature environment. In the case where the storage modulus at 120° C. is too low, mechanical properties (breaking strength, breaking elongation, etc.) tend to decrease in applications at high temperatures. From such a point of view, the storage modulus at 120° C. is more preferably 650 MPa or more, still more preferably 700 MPa or more, and particularly preferably 750 MPa or more. The above storage modulus (E') can be achieved when the aspect of the polymer Y is as specified in the invention. When the polymer Y content is reduced, the storage modulus (E') tends to decrease.

(Loss Modulus (E"))

It is preferable that the highly insulating film of the invention has a loss modulus (E") peak temperature of 120° C. or more and 150° C. or less as measured by dynamic viscoelasticity measurement at an oscillation frequency of 50 Hz. A moderately high loss modulus (E") peak temperature indicates that when the highly insulating film is heated, the temperature at which the molecular motion is increased is moderately high. Accordingly, heat resistance as a film tends to increase. From such a point of view, the loss modulus (E") peak temperature is more preferably 125° C. or more, still more preferably 130° C. or more, and particularly preferably 135° C. or more. Meanwhile, when the loss modulus (E") peak temperature is too high, this also means that the molecular motion is unlikely to be increased. Thus, probably because of increased stretching stress during stretching, breakage is likely to occur during biaxial stretching in the formation of a film. From such a point of view, the loss modulus (E") peak temperature is more preferably 145° C. or less, and still more preferably 140° C. or less. The above loss modulus (E") peak temperature can be achieved by suitably adjusting the polymer Y content. It is more preferable that the polymer Y content is within the preferred range specified in the invention. In addition, it is also advantageous that the content ratio of the polymer Y to the antioxidant (polymer Y content/antioxidant content) is within the preferred range specified in the invention. For example, when the polymer Y content is increased, the loss modulus (E") peak temperature tends to increase. When the polymer Y content is too low, the loss modulus (E") peak temperature tends to be too low, and it tends to be difficult for the peak temperature to reach 120° C.

(Dielectric Loss Tangent (tan δ))

It is preferable that the highly insulating film of the invention has a dielectric loss tangent (tan δ) at 120° C. of 0.0015 or less at a frequency of 1 kHz. In the case where the dielectric loss tangent (tan δ) at 120° C. is large, when the film is used at a high temperature (e.g., 120° C.) for a long period of time, self-heating occurs, and the film tends to be easily damaged. From such a point of view, the dielectric loss tangent (tan δ) at 120° C. is more preferably 0.0012 or less, still more preferably 0.0009 or less, and particularly preferably 0.0006 or less. The above dielectric loss tangent (tan δ) can be achieved by suitably adjusting the polymer Y content. It is more preferable that the polymer Y content is within the preferred range specified in the invention. In addition, it is also advantageous that that the content ratio of the polymer Y to the antioxidant (polymer Y content/antioxidant content) is within the preferred range specified in the invention. For example, when the polymer Y content is reduced, the dielectric loss tangent (tan δ) tends to decrease.

(Heat Shrinkage Rate)

It is preferable that the highly insulating film of the invention has a heat shrinkage rate at 200° C.×10 minutes of 6% or less in the longitudinal direction (the direction of the mechanical axis) and the transverse direction (the direction perpendicular to the direction of the mechanical axis and the thickness direction). When the heat shrinkage rate is within the above numerical range, blocking that occurs during the processing of a capacitor (deposition, etc.) can be suppressed, making it easier to obtain a capacitor having excellent quality. When the heat shrinkage rate is too high, blocking is likely to occur during the processing of a capacitor (deposition, etc.), and it tends to be difficult to obtain a non-defective product. From such a point of view, the heat shrinkage rate at 200° C.×10 minute is more preferably 5% or less, still more preferably 4% or less, and particularly preferably 3% or less. The above heat shrinkage rate can be achieved by adjusting the heat set temperature within the below-mentioned range. When the heat set temperature is increased, the heat shrinkage rate tends to decrease. In addition, a heat shrinkage rate within the above numerical range can be more effectively achieved by performing a heat relaxation treatment during heat setting or subsequent processes.

(Surface Roughness)

It is preferable that the highly insulating film of the invention has a center-line average surface roughness Ra of 7 nm or more and 89 nm or less on at least one side thereof. When the center-line average surface roughness Ra is within the above numerical range, the windability-improving effect can be enhanced. In addition, blocking resistance is improved, and good roll appearance can be achieved. In the case where the center-line average surface roughness Ra is too low, slidability tends to be too low, whereby the windability-improving effect is reduced. From such a point of view, the center-line average surface roughness Ra is preferably 11 nm or more, still more preferably 21 nm or more, and particularly preferably 31 nm or more. Meanwhile, in the case where the center-line average surface roughness Ra is too high, slidability tends to be too high, and the windability-improving effect is reduced; for example, edge misalignment is likely to occur during winding up. From such a point of view, the center-line average surface roughness Ra is more preferably 79 nm or less, still more preferably 69 nm or less, and particularly preferably 59 nm or less.

In addition, it is preferable that the highly insulating film of the invention has a ten-point average roughness Rz of 200 nm or more and 3,000 nm or less on at least one side thereof. When the ten-point average roughness Rz is within the above numerical range, the windability-improving effect can be enhanced. In the case where the ten-point average roughness Rz is too low, when the film is wound up to form a roll, air permeability tends to decrease, whereby the windability-improving effect is reduced; for example, the film is likely to slip sideways. In particular, in the case where the film thickness is small, the film loses its stiffness. As a result, air permeability tends to further decrease, and the windability-improving effect is further reduced. From such a point of view, the ten-point average roughness Rz is more preferably 600 nm or more, still more preferably 1,000 nm or more, and particularly preferably 1,250 nm or more. Meanwhile in the case where the ten-point average roughness Rz is too high, coarse projections tend to increase, and the breakdown-voltage-improving effect is reduced. From such a point of view, the ten-point average roughness Rz is more preferably 2,600 nm or less, still more preferably 2,250 nm or less, and particularly preferably 1,950 nm or less.

The above Ra and Rz can be achieved by employing the inert fine particles A specified in this application and preferably employing the inert fine particles B.

<Film Production Method>

Except for some special production methods, the highly insulating film of the invention can be basically obtained by a conventionally known method or a method accumulated in this industry. Hereinafter, a production method for obtaining the highly insulating film of the invention will be described in detail.

First, a resin composition, which is obtained by incorporating predetermined amounts of the polymer Y and the antioxidant into the styrene polymer having a syndiotactic structure, is heated and melted to form an unstretched sheet. Specifically, the resin composition is heated and melted at a temperature of not less than the melting point of the resin composition (Tm, unit: ° C.) and not more than (Tm+50° C.), extruded into a sheet, and then cooled and solidified to form an unstretched sheet. It is preferable that the obtained unstretched sheet has an intrinsic viscosity within a range of 0.35 to 0.9 dl/g. Subsequently, the unstretched sheet is biaxially stretched. In stretching, stretching in the longitudinal direction (the direction of the mechanical axis) and stretching in the transverse direction (the direction perpendicular to the direction of the mechanical axis and the thickness direction) may be performed simultaneously and may also be performed sequentially in an arbitrary order. For example, in the case of sequential stretching, first, the sheet is uniaxially stretched at a temperature of not less than (the glass transition temperature of the resin composition (Tg, unit: ° C.)−10° C.) and not more than (Tg+70° C.) to 2.7 times or more and 4.8 times or less the original length, preferably 2.9 times or more and 4.4 times or less the original length, and still more preferably 3.1 times or more and 4.0 times or less the original length. Subsequently, the sheet is stretched in the direction perpendicular to the uniaxial direction at a temperature of not less than Tg and not more than (Tg+80° C.) to 2.8 times or more and 4.9 times or less the original length, preferably 3.0 times or more and 4.5 times or less the original length, and still more preferably 3.2 times or more and 4.1 times or less the original length.

Incidentally, at the time of stretching in the direction perpendicular to the uniaxial direction, probably because crystallization has progressed during stretching at the previous stage, stretching is difficult, and breakage is likely to occur during the formation of a film. Breakage is likely to occur especially in the case of forming a thin film having a film thickness of about 3 μm and also especially when the draw ratio is within a range of 3.2 or more.

As a result of the consideration of countermeasures, it was found that in the above stretching in the direction perpendicular to the uniaxial direction, it is advantageous that the stretching rate is within a specific numerical range. That is, in the case where the stretching rate is too high, the molecular conformational change induced by stretching cannot follow the speed of change in the shape of the film due to stretching, and the conformation is likely to be distorted; probably because of this, film breakage is likely to occur. From such a point of view, the stretching rate is preferably 30,000%/min or less, more preferably 15,000%/min or less, still more preferably 9,000%/min or less, and particularly preferably 6,000%/min or less. Meanwhile, in the case where the stretching rate is too low, the crystallization of the film precedes the completion of stretching, whereby variations occur in stretching stress; probably because of this, stretching and thickness are likely to vary, whereby breakage is likely to occur. From such a point of view, the stretching rate is preferably 500%/min or more, more preferably 1,000%/min or more, still more preferably 2,000%/min or more, and particularly preferably 4,000%/min or more.

It was also found that as another technique effective in suppressing breakage, in the above stretching in the direction perpendicular to the uniaxial direction, it is advantageous that the stretching temperature is not constant but is divided into several levels, and a temperature difference is established between the temperature of the first stage and the temperature of the final stage. With respect to the temperature difference, it is preferable that the temperature of the final stage is at least 4° C. higher, more preferably at least 7° C. higher, still more preferably at least 12° C. higher, and particularly preferably at least 15° C. higher than the temperature of the first stage. In the case where the temperature difference is too large, film breakage tends to occur easily. In addition, the film after stretching tends to have a greater variation in thickness. From such a point of view, the temperature difference is preferably 49° C. or less, more preferably 39° C. or less, still more preferably 29° C. or less, and particularly preferably 20° C. or less. Thus, when the difference in temperature between the first stage and the final stage is within the above numerical range, in the formation of a film having a small film thickness, a high draw ratio, that is, a high refractive index in the thickness direction, which was heretofore difficult, can be achieved. This also makes it possible to obtain a film that is excellent in terms of thickness variation.

In the process of stretching in the direction perpendicular to the uniaxial direction, in order to establish a temperature difference between the first stage and the final stage, a temperature difference may be established between the zone entrance (first stage) and exit (final stage) in one stretching zone. It is also possible to create two or more successive stretching zones having different temperatures, and establish a temperature difference between the first stretching zone (first stage) and the final stretching zone (final stage). A zone herein means a region defined by a shutter or the like in a tenter or the like. In any case, it is preferable to further divide the interval between the first stage and the final stage, and ramp up the temperature from the first stage toward the final stage. It is particularly preferable to linearly increase the temperature. For example, in the case of two or more successive stretching zones having different temperatures, it is preferable to further create one or more stretching zones between the first stretching zone and the final stretching zone, and it is still more preferable to create one or more and ten or less stretching zones. When the total number of stretching zones is 11 or more, this is disadvantageous in terms of facility cost. In the case where a film is to be stretched widthwise, for example, stretching may be performed such that the film width immediately after the final stage divided by the film width immediately before the first stage is the desired draw ratio. It is preferable to ramp up the film width, and it is particularly preferable to increase it linearly. Similarly, also in the case where stretching in the longitudinal direction and stretching in the transverse direction are performed simultaneously, the stretching temperature is divided into several levels, and a temperature difference is established between the temperature of the first stage and the temperature of the final stage.

In the invention, these techniques are preferred examples of techniques for achieving the preferred refractive index in the thickness direction in the invention. Further, in the case where these techniques are employed, breakage is unlikely to occur even when the film thickness is reduced. Therefore, these techniques can be mentioned as preferred techniques for achieving the preferred film thickness in the invention. In the invention, it is also preferable to employ at least either the above aspect of stretching rate or the above aspect of stretching temperature, and it is more preferable to employ both aspects. As a result, the stretching process is stabilized, making it easier to achieve the preferred refractive index and the preferred film thickness in the invention.

Subsequently, the film is heat-set at a temperature of (Tg+70° C.) to Tm. The temperature of heat setting is 200° C. or more and 260° C. or less, preferably 220° C. or more and 250° C. or less, and still more preferably 230° C. or more and 240° C. or less. In the case where the heat set temperature is too high, film breakage is likely to occur especially in the production of a film having a small film thickness, and also the thickness variation is increased. After heat setting, as necessary, a relaxation treatment is performed at a temperature that is 20° C. to 90° C. lower than the heat set temperature to improve dimensional stability.

According to a preferred aspect, the highly insulating film of the invention may have a coating layer on one side or both sides of the film. It is preferable that the surface energy of the coating layer is smaller than the surface energy of the film. When the film has such a coating layer, even in the case where the film surface has some defects, such defective parts are coated with the coating layer, whereby the breakdown of the film due to the influence of the defects can be suppressed. As a result, the breakdown-voltage-improving effect can be enhanced. In addition, even when a breakdown is about to occur, the coating layer having a smaller surface energy first comes off the film. As a result, only the coating layer breaks, but the film does not break, causing no short-circuit conditions. The breakdown-voltage-improving effect can thus be enhanced.

EXAMPLES

Next, the invention will be described in further detail through Examples and Comparative Examples. The characteristic values in the examples were measured and evaluated by the following methods.

(1) Average Particle Size and Particle Size Ratio of Particles (1-1) Average Particle Size and Particle Size Ratio of Powder A powder was scattered on a sample table minimizing the overlapping of particles, and a gold thin film layer was deposited thereon to a thickness of 200 to 300 Å using a gold-sputtering apparatus. Subsequently, the particles were observed using a scanning electron microscope at a magnification of 10,000 to 30,000×. Using Luzex 500 manufactured by Nippon Regulator, at least 1,000 particles were measured for area-equivalent particle size (Di), major-axis size (Dli), and minor-axis size (Dsi).

(1-2) Average Particle Size and Particle Size Ratio of Particles in Film

A small piece of a film sample was fixed to a sample table for a scanning electron microscope. Using a sputtering apparatus manufactured by JEOL (ion-sputtering apparatus, JIS-1100), the film surface was ion-etched for 10 minutes in a vacuum of 0.13 Pa at 0.25 kV and 1.25 mA. Further, the film was gold-spattered in the same apparatus, and observed using a scanning electron microscope at a magnification of 10,000 to 30,000×. Using Luzex 500 manufactured by Nippon Regulator, at least 1,000 particles were measured for area-equivalent particle size (Di), major-axis size (Dli), and minor-axis size (Dsi).

The value obtained in (1-1) above for the average particle size and particle size ratio of a powder and the value obtained in (1-2) above for the average particle size and particle size ratio of particles in a film were each used in the following equation, wherein n is the number of particles, to determine the number average of the area-equivalent particle (Di) as the average particle size (D).

$$D = \left(\sum_{i=1}^{n} Di\right) \bigg/ n$$

In addition, from the average major-axis size (Dl) and average minor-axis size (Ds) obtained by the following equations, the particle size ratio was calculated as Dl/Ds.

$$Dl = \left(\sum_{i=1}^{n} Dli\right) \bigg/ n$$

$$Ds = \left(\sum_{i=1}^{n} Dsi\right) \bigg/ n$$

(2) Relative Standard Deviation in Particle Size of Particles

The relative standard deviation of a powder and the relative standard deviation of particles in a film were determined from the area-equivalent particle sizes (Di) and average particle sizes (D) of particles obtained in (1-1) and (1-2) above, respectively, using the following equation.

$$\text{Relative Standard Deviation} = \frac{\sqrt{\sum_{i=1}^{n} (Di - D)^2 / n}}{D}$$

(3) Surface Roughness of Film
(3-1) Center-Line Average Surface Roughness (Ra)

Using a non-contact three-dimensional roughness meter (manufactured by Kosaka Laboratory, ET-30HK), the projection profile on the surface of a film is measured with a semiconductor laser having a wavelength of 780 nm and an optical probe having a beam diameter of 1.6 μm under the following conditions: measurement length (Lx): 1 mm, sampling pitch: 2 μm, cut-off: 0.25 mm, magnification in the thickness direction: 10,000×, magnification in the transverse direction: 200×, number of scanning lines: 100 (i.e., measurement length in the direction Y Ly=0.2 mm). The value obtained by the following equation, wherein the roughness curve is expressed as Z=f (x, y), was taken as the center-line average surface roughness (Ra, unit: nm) of the film.

$$Ra = 1/(LxLy) \int_0^{Lx} \int_0^{Ly} |f(x, y)| \, dx \, dy$$

(4) Heat Shrinkage Rate

The heat shrinkage rates of a film (longitudinal direction and transverse direction) (unit: %) under no tension in an atmosphere of 200° C. for 10 minutes were determined.

(5) Refractive Index

The refractive index in the thickness direction (nZ) was measured at 23° C. and 65% RH with an Abbe refractometer using the sodium D-line (589 nm) as the light source.

(6) Breakdown Voltage (BDV)

Measurement was performed in accordance with the method of JIS C 2151. A column made of brass 25 mm in diameter was used as the upper electrode and a column made of aluminum 75 mm in diameter was used as the lower electrode. Using a DC withstand voltage tester in an atmosphere of 23° C. and a relative humidity of 50%, the voltage was boosted at a boosting rate of 100 V/sec, and the voltage (unit: V) when the film broke, causing a short circuit, was read. The obtained voltage was divided by the film thickness (unit: μm) to determine breakdown voltage (unit: V/μm). The measurement was performed at 41 points. The first ten largest points and the first ten smallest points were removed, and the median of the remaining 21 points was taken as the measured value of breakdown voltage.

In measurement at 120° C., electrodes and a sample were placed in a hot air oven. The oven was connected to a power supply through a heat-resistant cord, boosting was started in 1 minute after placing into the oven, and breakdown voltage was measured in the same manner as above.

(7) Stretchability

Based on the number of breaks that occurred during the formation of a biaxially stretched film with a length of 100,000 m, the evaluation was made as follows.

Stretchability A: Less than one break per 100,000-m film formation

Stretchability B: One to less than two breaks per 100,000-m film formation

Stretchability C: Two to less than four breaks per 100,000-m film formation

Stretchability D: Four to less than eight breaks per 100,000-m film formation

Stretchability DD: Eight or more breaks per 100,000-m film formation (8) Windability In the film production process, a film was wound up at a rate of 140 m/min to form a 9,000-m roll having a width of 500 mm. The wound configuration of the obtained roll and edge misalignment at the roll edges were rated as follows.

[Wound Configuration]

A: The roll surface has no pimples; the wound configuration is good.

B: The roll surface has one or more and less than four pimples (projecting bulges); the wound configuration is nearly good.

C: The roll surface has four or more and less than ten pimples (projecting bulges); the wound configuration is slightly poor, but it is usable as a product.

D: The roll surface has ten or more pimples (projecting bulges); the wound configuration is poor, and it is unusable as a product.

[Edge Misalignment]

A: Roll edge misalignment is less than 0.5 mm; good.

B: Roll edge misalignment is 0.5 mm or more and less than 1 mm; nearly good.

C: Roll edge misalignment is 1 mm or more and less than 2 mm; slightly poor, but usable as a product.

D: Roll edge misalignment is 2 mm or more; poor, and unusable as a product.

DD: Significant edge misalignment occurs during winding up a roll, and a 9,000-m roll cannot be prepared.

(9) Thermal Decomposition Temperature

Using a thermogravimetric/differential thermal analyzer (manufactured by Seiko Instruments & Electronics, trade name: TG/DTA220), measurement was performed in an air atmosphere at a temperature rise rate of 10° C./min. From the temperature/weight change curve, the temperature at which the weight started to change was determined by a tangent method as the thermal decomposition temperature (unit: ° C.).

(10) Glass Transition Temperature and Melting Point

A sample weighing about 20 mg was enclosed in a pan made of aluminum for measurement and attached to a differential scanning calorimeter (DSC) (manufactured by TA Instruments, trade name: DSCQ 100). The temperature was raised from room temperature (25° C.) to 280° C. at a rate of 20° C./min, and the melting point was measured. Subsequently, the sample was rapidly cooled, then the temperature was raised again at a rate of 20° C./min, and the glass transition temperature (unit: ° C.) was measured.

(11) Storage Modulus (E'), Loss Modulus (E''), Dielectric Loss Tangent (tan δ)

Using a dynamic viscoelasticity measuring apparatus (manufactured by Orientec, DDV-01FP), the storage modulus (E') (unit: MPa) and the loss modulus (E'') (unit: MPa) of a film sample were measured at an oscillation frequency of 10 Hz while raising the temperature at a rate of 2° C./min from 25° C. to 230° C. At this time, the sample length was 4 cm in the measurement direction×3 mm in the width direction (between chucks: 3 cm). From the test results, the loss modulus (E'') peak temperature (unit: ° C.) and the storage modulus (E') (unit: MPa) at a temperature of 120° C. were determined. Incidentally, measurement was performed in the longitudinal and transverse directions of the film, and the average thereof was calculated.

In addition, dielectric loss tangent (tan δ) was determined by measurement at a temperature of 120° C. and an oscillation frequency of 1 kHz using a dielectric loss measuring apparatus (TR-10C) manufactured by Ando Electric. The sample was prepared in accordance with JIS C 2151. Incidentally, measurement was performed in the longitudinal and transverse directions of the film, and the average thereof was calculated.

Example 1

A resin composition was obtained by mixing the following components: 67.5 parts by mass of polystyrene having a weight average molecular weight of $3.0 \times 10^5$ and observed to have a nearly perfect syndiotactic structure by $^{13}$C-NMR measurement; as a polymer Y, poly(2,6-dimethyl-1,4-phenylene) ether having an intrinsic viscosity of 0.32 dl/g as measured in chloroform (also referred to as polyphenylene ether and may be abbreviated to PPE; glass transition temperature: 210° C.) in an amount of 30 parts by mass (30 mass % based on 100 mass % of the resulting film); as an antioxidant, pentaerythritol tetrakis{3-(3,5-di-t-butyl-4-hydroxyphenyl) propionate} (manufactured by Ciba Specialty Chemicals, trade name: IRGANOX 1010, melting point: 120° C., thermal decomposition temperature: 335° C., C1) in an amount of 2.0 parts by mass (2.0 mass % based on 100 mass % of the resulting film); and as inert fine particles A, spherical silicone resin particles having an average particle size of 0.3 μm, a relative standard deviation of 0.15, and a particle size ratio of 1.10 in an amount of 0.5 parts by mass (0.5 mass % based on 100 mass % of the resulting film).

The obtained resin composition was dried at 120° C. for 7 hours, then fed to an extruder, melted at 290° C., extruded through a die slit, and then cooled and solidified on a casting drum cooled to 50° C. to form an unstretched sheet.

The unstretched sheet was stretched to 3.1 times the original length in the longitudinal direction (the direction of the mechanical axis) at 140° C., subsequently guided to a tenter, and then stretched to 3.4 times the original length in the transverse direction (the direction perpendicular to the direction of the mechanical axis and the thickness direction). The rate of stretching in the transverse direction at that time was 5,000%/min. In addition, the temperature of stretching in the transverse direction was 126° C. at the first stage and 145° C. at the final stage. Subsequently, the sheet was heat-set at 240° C. for 9 seconds, and further cooled to 180° C. while performing a 4% relaxation treatment in the transverse direction to form a biaxially stretched film having a thickness of 3.0 μm. The film was wound up to form a roll. The characteristics of the obtained film are shown in Table 1.

Examples 2C and 3C, Comparative Examples 1 to 3

Biaxially stretched films having a thickness of 3.0 μm were obtained in the same manner as in Example 1 and each wound up to form a roll, except that the content of PPE as a polymer Y, the antioxidant content, and the film-forming conditions were as shown in Table 1. The characteristics of the obtained films are shown in Table 1. Incidentally, with an increase or a decrease in the polymer Y and antioxidant contents, the polystyrene amount was adjusted so that the total amount was 100 parts by mass.

Examples 1, 2C and 3C and Comparative Examples 1 to 3 provide information about the presence and contents of PPE as a polymer Y and an antioxidant.

The films obtained in Examples 1 and 2C, where the polymer Y (PPE) and antioxidant contents were appropriate, had excellent stretchability and windability together with high breakdown voltage, and thus were suitable as insulators for capacitors for hybrid cars, etc.

The film obtained in Example 3C had slightly poor stretchability and windability.

In Comparative Example 3, the polymer Y (PPE) content was too high. Probably because the sea-island structure of the polymer was thereby destabilized, the film had poor stretchability and was susceptible to breakage in a tenter or the like during film formation, and, although a cut sheet sample was obtainable, it was difficult to obtain a long roll sample. In addition, the film was also poor in terms of thickness variation. The obtained film was not durable for use as an insulator for capacitors.

TABLE 1

| | | | Unit | Comparative Example 1 | Comparative Example 2 | Example 1 | Example 2C | Example 3C | Comparative Example 3 |
|---|---|---|---|---|---|---|---|---|---|
| Inert Fine Particles A | | Kind | — | Spherical Silicone Resin Particles | Spherical Silicone Resin Particles | Spherical Silicone Resin Particles | Spherical Silicone Resin Particles | Spherical Silicone Resin Particles | Spherical Silicone Resin Particles |
| | In Film | Average Particle Size | μm | 0.3 | 0.3 | 0.3 | 0.3 | 0.3 | 0.3 |
| | | Relative Standard Deviation in Particle Size | — | 0.15 | 0.15 | 0.15 | 0.15 | 0.15 | 0.15 |
| | | Particle Size Ratio | — | 1.10 | 1.10 | 1.10 | 1.10 | 1.10 | 1.10 |
| | | Content | mass % | 0.5 | 0.5 | 0.5 | 0.5 | 0.5 | 0.5 |
| Inert Fine Particles B | | Kind | — | None | None | None | None | None | None |
| | In Film | Average Particle Size | μm | — | — | — | — | — | — |
| | | Relative Standard Deviation in Particle Size | — | — | — | — | — | — | — |
| | | Particle Size Ratio | — | — | — | — | — | — | — |
| | Content | | mass % | — | — | — | — | — | — |
| Polymer Y | | Kind | — | None | None | PPE | PPE | PPE | PPE |
| | Glass Transition Temperature Tg | | ° C. | — | — | 210 | 210 | 210 | 210 |
| | Content | | mass % | — | — | 30 | 20 | 40 | 50 |
| Antioxidant | | Kind | — | None | C1 | C1 | C1 | C1 | C1 |
| | Melting Point | | ° C. | — | 120 | 120 | 120 | 120 | 120 |
| | Thermal Decomposition Temperature | | ° C. | — | 335 | 335 | 335 | 335 | 335 |
| | Content | | mass % | — | 2.0 | 2.0 | 2.0 | 2.0 | 2.0 |

TABLE 1-continued

| | | | Unit | Comparative Example 1 | Comparative Example 2 | Example 1 | Example 2C | Example 3C | Comparative Example 3 |
|---|---|---|---|---|---|---|---|---|---|
| Content Ratio of Polymer Y to Antioxidant (Polymer Y Content/Antioxidant Content) | | | — | — | — | 0.0 | 15.0 | 10.0 | 20.0 | 25.0 |
| Film-Forming Conditions | Longitudinal Draw Ratio | | times the original length | 3.1 | 3.1 | 3.1 | 3.1 | 3.1 | 3.1 |
| | Longitudinal Stretching Temperature | | °C. | 114 | 114 | 140 | 130 | 150 | 160 |
| | Transverse Draw Ratio | | times the original length | 3.4 | 3.4 | 3.4 | 3.4 | 3.4 | 3.4 |
| | Transverse Stretching Temperature | First Stage | °C. | 105 | 105 | 126 | 114 | 129 | 145 |
| | | Final Stage | °C. | 120 | 120 | 145 | 137 | 152 | 165 |
| Film Characteristics | Stretchability | | — | A | A | A | A | C | D |
| | Windability | Wound Configuration | — | A | A | A | A | B | C |
| | | Edge Misalignment | — | A | A | A | A | B | B |
| | Film Thickness | | μm | 3.0 | 3.0 | 3.0 | 3.0 | 3.0 | 3.0 |
| | Loss Modulus (E") Peak Temperature | | °C. | 111 | 111 | 136 | 128 | 144 | 152 |
| | Dielectric Loss Tangent (tanδ) at 120° C. | | — | 0.0019 | 0.0019 | 0.0007 | 0.0010 | 0.0011 | 0.0012 |
| | Storage Elastic Modulus (E') at 120° C. | | MPa | 500 | 500 | 2000 | 810 | 2000 | 2000 |
| | Center-Line Average Surface Roughness (Ra) | | nm | 16 | 16 | 16 | 16 | 16 | 16 |
| | Refractive Index in Thickness Direction (nZ) | | — | 1.6230 | 1.6250 | 1.6000 | 1.6150 | 1.6073 | 1.5900 |
| | Heat Shrinkage Rate at 200° C. × 10 min | Longitudinal Direction | % | 3.2 | 3.2 | 3.0 | 3.1 | 2.9 | 2.9 |
| | | Transverse Direction | % | 1.5 | 1.5 | 1.3 | 1.4 | 1.3 | 1.2 |
| | Breakdown Voltage (BDV) | 23° C. | V/μm | 310 | 355 | 500 | 490 | 495 | 510 |
| | | 120° C. | V/μm | 290 | 335 | 410 | 405 | 415 | 420 |

Example 4C

A biaxially stretched film having a thickness of 3.0 μm was obtained in the same manner as in Example 1 and wound up to form a roll, except that 30 mass % of polycarbonate having a melt viscosity at 280° C. of 150 Pa-sec and a glass transition temperature Tg of 145° C. was used as a polymer Y and that the film-forming conditions were as shown in Table 2. The characteristics of the obtained film are shown in Table 2.

Example 5

A biaxially stretched film having a thickness of 3.0 μm was obtained in the same manner as in Example 1 and wound up to form a roll, except that N,N'-bis{3-(3,5-di-t-butyl-4-hydroxyphenyl)propiony}hydrazine (manufactured by Ciba Specialty Chemicals, trade name: IRGANOX 1024, melting point: 210° C., thermal decomposition temperature: 275° C., C2) was used as an antioxidant. The characteristics of the obtained film are shown in Table 2.

Example 6

A biaxially stretched film having a thickness of 3.0 μm was obtained in the same manner as in Example 1 using 67.5 parts by mass of polystyrene and wound up to form a roll, except that spherical silicone resin particles having an average particle size of 0.5 μm, a relative standard deviation of 0.15, and a particle size ratio of 1.08 were used as inert fine particles A in an amount of 0.5 parts by mass (0.5 mass % based on 100 mass % of the resulting film). The characteristics of the obtained film are shown in Table 2.

Examples 7 to 9

A biaxially stretched film having a thickness of 3.0 μm was obtained in the same manner as in Example 6 and wound up to form a roll, except that the average particle size, relative standard deviation, particle size ratio, and content of spherical silicone resin particles as inert fine particles A were as shown in Table 2. The characteristics of the obtained film are shown in Table 2. Incidentally, with an increase or a decrease in the content of the inert fine particles A, the polystyrene amount was adjusted so that the total amount was 100 parts by mass.

Example 10

A biaxially stretched film having a thickness of 3.0 μm was obtained in the same manner as in Example 1 and wound up to form a roll, except that the following components were mixed: 67.4 parts by mass of polystyrene; as inert fine particles A, spherical silicone resin particles having an average particle size of 0.3 μm, a relative standard deviation of 0.17, and a particle size ratio of 1.10 in an amount of 0.5 parts by mass (0.5 mass % based on 100 mass % of the resulting film); and as inert fine particles B, spherical silicone resin particles having an average particle size of 0.5 μm, a relative standard deviation of 0.15, and a particle size ratio of 1.10 in an amount of 0.1 parts by mass (0.1 mass % based on 100 mass % of the resulting film). The characteristics of the obtained film are shown in Table 2.

Examples 11 and 12

A biaxially stretched film having a thickness of 3.0 μm was obtained in the same manner as in Example 10 and wound up to form a roll, except that the average particle size, relative standard deviation, particle size ratio, and content of spherical silicone resin particles as inert fine particles A and the average particle size, relative standard deviation, particle size ratio, and content of spherical silicone resin particles as inert fine particles B were as shown in Table 2. The characteristics of the obtained film are shown in Table 2. Incidentally, with an increase or a decrease in the contents of the inert fine particles A and inert fine particles B, the polystyrene amount was adjusted so that the total amount was 100 parts by mass.

Example 13

A biaxially stretched film having a thickness of 3.0 μm was obtained in the same manner as in Example 1 and wound up to form a roll, except that as inert fine particles A, spherical silicone resin particles having an average particle size of 1.3 μm, a relative standard deviation of 0.14, and a particle size ratio of 1.10 was used in an amount of 0.3 parts by mass (0.3 mass % based on 100 mass % of the resulting film). The characteristics of the obtained film are shown in Table 2.

Example 1 and Examples 6 to 13 provide information about the aspects of the inert fine particles A and inert fine particles B.

The films obtained in Examples 1 and 6 to 13, where the aspects of the inert fine particles contained were appropriate, had excellent stretchability and windability together with high breakdown voltage, and thus were suitable as insulators for capacitors.

TABLE 2

| | | | Unit | Example 4C | Example 5 | Example 6 | Example 7 | Example 8 | Example 9 |
|---|---|---|---|---|---|---|---|---|---|
| Inert Fine Particles A | Kind | | — | Spherical Silicone Resin Particles | Spherical Silicone Resin Particles | Spherical Silicone Resin Particles | Spherical Silicone Resin Particles | Spherical Silicone Resin Particles | Spherical Silicone Resin Particles |
| | In Film | Average Particle Size | μm | 0.3 | 0.3 | 0.5 | 0.3 | 0.3 | 0.5 |
| | | Relative Standard Deviation in Particle Size | — | 0.15 | 0.15 | 0.15 | 0.15 | 0.15 | 0.15 |
| | | Particle Size Ratio | — | 1.10 | 1.10 | 1.08 | 1.10 | 1.10 | 1.10 |
| | Content | | mass % | 0.5 | 0.5 | 0.5 | 0.2 | 0.1 | 0.2 |
| Inert Fine Particles B | Kind | | — | None | None | None | None | None | None |
| | In Film | Average Particle Size | μm | — | — | — | — | — | — |
| | | Relative Standard Deviation in Particle Size | — | — | — | — | — | — | — |
| | | Particle Size Ratio | — | — | — | — | — | — | — |
| | Content | | mass % | — | — | — | — | — | — |
| Polymer Y | Kind | | — | PC | PPE | PPE | PPE | PPE | PPE |
| | Glass Transition Temperature Tg | | °C. | 145 | 210 | 210 | 210 | 210 | 210 |
| | Content | | mass % | 30 | 30 | 30 | 30 | 30 | 30 |
| Antioxidant | Kind | | — | C1 | C2 | C1 | C1 | C1 | C1 |
| | Melting Point | | °C. | 120 | 210 | 120 | 120 | 120 | 120 |
| | Thermal Decomposition Temperature | | °C. | 335 | 275 | 335 | 335 | 335 | 335 |
| | Content | | mass % | 2.0 | 2.0 | 2.0 | 2.0 | 2.0 | 2.0 |
| Content Ratio of Polymer Y to Antioxidant (Polymer Y Content/Antioxidant Content) | | | — | 15.0 | 15.0 | 15.0 | 15.0 | 15.0 | 15.0 |
| Film-Forming Conditions | Longitudinal Draw Ratio | | times the original length | 2.5 | 3.1 | 3.1 | 3.1 | 3.1 | 3.1 |
| | Longitudinal Stretching Temperature | | °C. | 130 | 140 | 140 | 140 | 140 | 140 |
| | Transverse Draw Ratio | | times the original length | 3.0 | 3.4 | 3.4 | 3.4 | 3.4 | 3.4 |
| | Transverse Stretching Temperature | First Stage | °C. | 115 | 126 | 126 | 126 | 126 | 126 |
| | | Final Stage | °C. | 135 | 145 | 145 | 145 | 145 | 145 |
| Film Characteristics | Stretchability | | — | B | B | A | A | A | A |
| | Windability | Wound Configuration | — | A | A | A | B | B | A |
| | | Edge Misalignment | — | A | A | A | B | B | A |
| | Film Thickness | | μm | 3.0 | 3.0 | 3.0 | 3.0 | 3.0 | 3.0 |
| | Loss Modulus (E″) Peak Temperature | | °C. | 110 | 130 | 135 | 135 | 135 | 135 |
| | Dielectric Loss Tangent (tanδ) at 120° C. | | — | 0.0015 | 0.0010 | 0.0007 | 0.0007 | 0.0007 | 0.0007 |
| | Storage Elastic Modulus (E′) at 120° C. | | MPa | 800 | 1100 | 2000 | 2000 | 2000 | 2000 |
| | Center-Line Average Surface Roughness (Ra) | | nm | 17 | 17 | 25 | 15 | 13 | 20 |
| | Refractive Index in Thickness Direction (nZ) | | — | 1.6200 | 1.6020 | 1.6000 | 1.6010 | 1.6020 | 1.6010 |

TABLE 2-continued

|  |  |  |  |  |  |  |  |  |
|---|---|---|---|---|---|---|---|---|
| Heat Shrinkage Rate at 200° C. × 10 min | Longitudinal Direction | % | 2.2 | 2.5 | 3.1 | 3.3 | 3.5 | 3.2 |
|  | Transverse Direction | % | 0.3 | 0.5 | 1.5 | 1.7 | 1.8 | 1.5 |
| Breakdown Voltage (BDV) | 23° C. | V/μm | 400 | 410 | 480 | 510 | 530 | 500 |
|  | 120° C. | V/μm | 350 | 360 | 400 | 415 | 425 | 410 |

|  |  |  | Unit | Example 10 | Example 11 | Example 12 | Example 13 |
|---|---|---|---|---|---|---|---|
| Inert Fine Particles A | Kind |  | — | Spherical Silicone Resin Particles | Spherical Silicone Resin Particles | Spherical Silicone Resin Particles | Spherical Silicone Resin Particles |
|  | In Film | Average Particle Size | μm | 0.3 | 0.3 | 0.3 | 1.3 |
|  |  | Relative Standard Deviation in Particle Size | — | 0.17 | 0.17 | 0.17 | 0.14 |
|  |  | Particle Size Ratio | — | 1.10 | 1.10 | 1.10 | 1.10 |
|  | Content |  | mass % | 0.5 | 0.2 | 0.2 | 0.3 |
| Inert Fine Particles B | Kind |  | — | Spherical Silicone Resin Particles | Spherical Silicone Resin Particles | Spherical Silicone Resin Particles | None |
|  | In Film | Average Particle Size | μm | 0.5 | 1.3 | 1.3 | — |
|  |  | Relative Standard Deviation in Particle Size | — | 0.15 | 0.14 | 0.14 | — |
|  |  | Particle Size Ratio | — | 1.10 | 1.10 | 1.10 | — |
|  | Content |  | mass % | 0.1 | 0.3 | 0.5 | — |
| Polymer Y | Kind |  | — | PPE | PPE | PPE | PPE |
|  | Glass Transition Temperature Tg |  | ° C. | 210 | 210 | 210 | 210 |
|  | Content |  | mass % | 30 | 30 | 30 | 30 |
| Antioxidant | Kind |  | — | C1 | C1 | C1 | C1 |
|  | Melting Point |  | ° C. | 120 | 120 | 120 | 120 |
|  | Thermal Decomposition Temperature |  | ° C. | 335 | 335 | 335 | 335 |
|  | Content |  | mass % | 2.0 | 2.0 | 2.0 | 2.0 |
| Content Ratio of Polymer Y to Antioxidant (Polymer Y Content/Antioxidant Content) |  |  | — | 15.0 | 15.0 | 15.0 | 15.0 |
| Film-Forming Conditions | Longitudinal Draw Ratio |  | times the original length | 3.1 | 3.1 | 3.1 | 3.1 |
|  | Longitudinal Stretching Temperature |  | ° C. | 140 | 140 | 140 | 140 |
|  | Transverse Draw Ratio |  | times the original length | 3.4 | 3.4 | 3.4 | 3.4 |
|  | Transverse Stretching Temperature | First Stage | ° C. | 126 | 126 | 126 | 126 |
|  |  | Final Stage | ° C. | 145 | 145 | 145 | 145 |
| Film Characteristics | Stretchability |  | — | A | A | A | A |
|  | Windability | Wound Configuration | — | A | A | A | A |
|  |  | Edge Misalignment | — | A | A | A | A |
|  | Film Thickness |  | μm | 3.0 | 3.0 | 3.0 | 3.0 |
|  | Loss Modulus (E″) Peak Temperature |  | ° C. | 135 | 136 | 134 | 135 |
|  | Dielectric Loss Tangent (tanδ) at 120° C. |  | — | 0.0007 | 0.0007 | 0.0010 | 0.0007 |
|  | Storage Elastic Modulus (E′) at 120° C. |  | MPa | 2000 | 2100 | 1500 | 2100 |
|  | Center-Line Average Surface Roughness (Ra) |  | nm | 20 | 27 | 30 | 27 |
|  | Refractive Index in Thickness Direction (nZ) |  | — | 1.6040 | 1.6020 | 1.6040 | 1.6000 |
|  | Heat Shrinkage Rate at 200° C. × 10 min | Longitudinal Direction | % | 3.0 | 3.2 | 2.8 | 3.3 |
|  |  | Transverse Direction | % | 1.7 | 1.5 | 0.7 | 1.7 |
|  | Breakdown Voltage (BDV) | 23° C. | V/μm | 480 | 470 | 450 | 490 |
|  |  | 120° C. | V/μm | 400 | 390 | 360 | 410 |

Using the obtained films, capacitors were prepared as follows.

First, aluminum was vacuum-deposited on one side of a film to a thickness of 500 A. At that time, aluminum was deposited in the form of longitudinal stripes formed by the repetition of 8-mm-wide deposition regions and 1-mm-wide non-deposition regions. The obtained deposited film was slit at the center of the width of a deposition region and also at the center of the width of a non-deposition region to form a 4.5-mm-wide tape including a 4-mm-wide deposition region and a 0.5-mm-wide non-deposition region. The tape was wound up to form a reel. Subsequently, two reels were combined in such a manner that the non-deposition regions were at the opposite edges, respectively, followed by winding to form a wound body. The wound body was then pressed at 150° C. and 1 MPa for 5 minutes. Metallikon was sprayed to both edges of the pressed wound body to form external electrodes, and lead wires were welded to metallikon. A wound film capacitor was thus prepared.

Film capacitors made using the films obtained in Examples 1 to 13 had excellent heat resistance and withstand voltage characteristics (breakdown voltage (BDV)) and exhibited excellent performance as capacitors. The processability during the capacitor preparation was also excellent. In particular, a film capacitor made using the film obtained in Example 1 had particularly excellent withstand voltage characteristics and exhibited even better performance as a capacitor.

ADVANTAGE OF THE INVENTION

The invention enables the provision of a highly insulating film having excellent electrical characteristics, heat resistance, and handling properties. In particular, a highly insulating film having high breakdown voltage can be obtained. In addition, a highly insulating film having high breakdown voltage even at a high temperature can be obtained. Accordingly, a highly insulating film obtained by the invention is suitable as an insulator for capacitors. It is particularly suitable as an insulator for higher-performance capacitors such as capacitors for use in hybrid cars, etc.

INDUSTRIAL APPLICABILITY

The highly insulating film of the invention is suitable as an insulator for capacitors. It is particularly suitable as an insulator for capacitors for use in hybrid cars, etc., which is to be exposed to an environment of relatively high temperatures.

The invention claimed is:

1. An insulating film comprising a biaxially stretched film made of a styrene polymer having a syndiotactic structure as a main component,
the biaxially stretched film containing:
inert fine particles A having an average particle size of 0.05 μm or more and 1.5 μm or less with a relative standard deviation in particle size of 0.5 or less in an amount of 0.05 mass % or more and 2.0 mass % or less;
an antioxidant in an amount of 0.1 mass % or more and 8 mass % or less; and
a polymer Y having a glass transition temperature Tg by DSC of 130° C. or more in an amount of 20 mass % or more and 48 mass % or less, wherein the polymer Y is polyphenylene ether represented by the following formula (1):

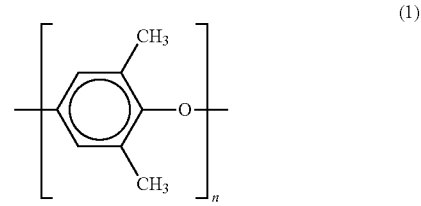

the biaxially stretched film having a breakdown voltage (BDV) at 120° C. of 350 V/μm or more, and a refractive index in the thickness direction of 1.5750 or more and 1.6040 or less.

2. The insulating film according to claim 1, wherein the content ratio of the polymer Y to the antioxidant (polymer Y content/antioxidant content) is 1 to 100.

3. The insulating film according to claim 1, having:
a loss modulus (E") peak temperature of 120° C. or more and 150° C. or less as measured by dynamic viscoelasticity measurement at an oscillation frequency of 10 Hz; and
a dielectric loss tangent (tan δ) at 120° C. of 0.0015 or less at a frequency of 1 kHz.

4. The insulating film according to claim 1, having a heat shrinkage rate at 200° C.×10 minutes of 6% or less in longitudinal and transverse directions thereof.

5. The insulating film according to claim 1, having a storage modulus (E') at 120° C. of 600 MPa or more as measured by dynamic viscoelasticity measurement at an oscillation frequency of 10 Hz.

6. The insulating film according to claim 1, having a film thickness of 0.4 μm or more and less than 6.5 μm.

7. The insulating film according to claim 1, containing inert fine particles B having an average particle size of 0.5 μm or more and 3.0 μm or less with a relative standard deviation in particle size of 0.5 or less in an amount of 0.01 mass % or more and 1.5 mass % or less, with the average particle size of the inert fine particles B being at least 0.2 μm larger than the average particle size of the inert fine particles A.

8. The insulating film according to claim 7, wherein the inert fine particles B are spherical polymer resin particles having a particle size ratio of 1.0 or more and 1.3 or less.

9. The insulating film according to claim 1, wherein the inert fine particles A are spherical particles having a particle size ratio of 1.0 or more and 1.3 or less.

10. The insulating film according to claim 9, wherein the inert fine particles A are spherical polymer resin particles.

11. The insulating film according to claim 9, wherein the inert fine particles A are spherical silicone resin particles.

12. The insulating film according to claim 1, wherein the antioxidant has a thermal decomposition temperature of 250° C. or more.

13. The insulating film according to claim 1, wherein the antioxidant in an amount of 0.5 mass % or more and 3 mass % or less.

14. A capacitor made using the insulating film according to claim 1.

* * * * *